United States Patent
Wellpott et al.

(10) Patent No.: US 11,097,684 B2
(45) Date of Patent: Aug. 24, 2021

(54) HOUSING OF A GAS GENERATOR MODULE FOR AN AIRBAG SYSTEM OF A MOTOR VEHICLE

(71) Applicant: BENTELER STEEL/TUBE GMBH, Paderborn (DE)

(72) Inventors: Marcel Wellpott, Paderborn (DE); Daniel Luecke, Paderborn (DE); Dirk Tegethoff, Salzkotten (DE)

(73) Assignee: BENTELER STEEL/TUBE GMBH, Paderborn (DE)

( * ) Notice: Subject to any disclaimer, the term of this patent is extended or adjusted under 35 U.S.C. 154(b) by 79 days.

(21) Appl. No.: 16/294,666

(22) Filed: Mar. 6, 2019

(65) Prior Publication Data
US 2019/0275980 A1 Sep. 12, 2019

(30) Foreign Application Priority Data

Mar. 9, 2018 (DE) .......................... 102018105445.9

(51) Int. Cl.
*B60R 21/26* (2011.01)
*B60R 21/217* (2011.01)

(52) U.S. Cl.
CPC .......... *B60R 21/26* (2013.01); *B60R 21/2176* (2013.01); *B60R 2021/26041* (2013.01); *B60R 2021/26076* (2013.01)

(58) Field of Classification Search
CPC ................ B60R 21/26; B60R 21/2176; B60R 2021/26041; B60R 2021/26076
USPC ....................................................... 280/741
See application file for complete search history.

(56) References Cited

U.S. PATENT DOCUMENTS

| 5,611,563 | A | * | 3/1997 | Olson | ................. | B60R 21/2171 |
|---|---|---|---|---|---|---|
| | | | | | | 280/728.2 |
| 6,662,727 | B2 | * | 12/2003 | Bornheim | ............. | B60R 21/017 |
| | | | | | | 102/202.14 |
| 7,354,062 | B2 | * | 4/2008 | Heigl | .................... | B60R 21/232 |
| | | | | | | 280/740 |
| 7,370,884 | B2 | * | 5/2008 | Clark | ..................... | B60R 21/26 |
| | | | | | | 280/728.2 |
| 8,091,921 | B2 | * | 1/2012 | Heigl | ..................... | B60R 21/26 |
| | | | | | | 280/742 |
| 2007/0257476 | A1 | * | 11/2007 | Green, Jr. | ............. | B60R 21/268 |
| | | | | | | 280/737 |

FOREIGN PATENT DOCUMENTS

| DE | 4138888 | 6/1992 |
|---|---|---|
| DE | 4442202 | 5/1996 |
| DE | 69313575 | 1/1998 |

(Continued)

OTHER PUBLICATIONS

Official Action for German Patent Application No. 102018105445.9, dated Oct. 24, 2018, 4 pages.

*Primary Examiner* — Faye M Fleming
(74) *Attorney, Agent, or Firm* — Sheridan Ross P.C.

(57) ABSTRACT

The invention relates to a housing of a gas generator module for an airbag system of a motor vehicle, wherein the housing is of substantially tubular design and has a tube portion in which a plurality of stamped formations pointing into the interior of the housing are introduced over an external circumference of the housing, wherein the stamped formations in the interior of the tube portion have a stop for an internal component.

20 Claims, 8 Drawing Sheets

(56) References Cited

FOREIGN PATENT DOCUMENTS

| | | |
|---|---|---|
| DE | 19822654 | 11/1999 |
| DE | 10006280 | 9/2001 |
| DE | 102006004036 | 8/2007 |
| DE | 102013224767 | 6/2015 |

\* cited by examiner

HOUSING OF A GAS GENERATOR MODULE FOR AN AIRBAG SYSTEM OF A MOTOR VEHICLE

CROSS-REFERENCE TO RELATED APPLICATIONS

This application claims the benefit of German Patent Application No. 10 2018 105 445.9 filed Mar. 9, 2018, the entire contents of which are incorporation herein by reference.

FIELD

The invention relates to a housing of a gas generator module for an airbag system of a motor vehicle.

BACKGROUND

Such a housing of a gas generator module for an airbag system of a motor vehicle is known, for example, from DE 10 2014 203 170A1. The housing there is of tubular design and has a tube wall which extends from the first axial end portion to a second axial end portion of the housing. At the first axial end portion, an igniting device is fixed in the housing by means of circular impressions, the impressions continuing in the igniting device. At the other axial end portion, a spiral spring is arranged in the form of a volume compensating element and is supported there on a bottom of the housing. A gas unit consisting of a multiplicity of tablet-shaped elements is arranged here between the spiral spring and the igniting device. The igniting device is held in a force-fitting manner in the interior of the housing by means of the circulate impressions there. In order to fix the igniting device in the interior of the housing, the corresponding impressions are introduced here into the igniting device during the introduction of the circular impressions, and therefore the igniting device is thereby also positioned within the housing. However, a defined introduction of the impressions is not made possible as a result since said impressions are also independent on the composition of the igniting device. In addition, the impressions can only be introduced if the igniting device is already located in the interior of the housing. Corresponding premanufacturing of the housing with impressions is therefore not possible in the case of this housing.

Furthermore, it is also known to introduce an axially revolving, roller-burnished bead into the housing for fixing internal components in housings of a gas generator module for an airbag system of a motor vehicle. Roller-burnished beads of this type can be introduced here by means of cold or hot forming.

Furthermore, it is also known, for the introduction of fixing elements, to reduce a corresponding tube portion of the housing in diameter by a crimping process by a radial feed motion over the entire circumference by means of multi-part tool segments.

Both the roller-burnishing and the crimping are complicated and problematic here in the production of the housing. Both during the roller-burnishing and during the crimping, complex tool and workpiece movements during the formation operation have to be carried out in different directions in space during the rotation or radial feed motion and axial displacements. This frequently makes a combination with further processing steps impossible since the roller-burnishing and crimping are highly complex and require the complicated and also costly configuration of the tools. Furthermore, production methods of this type using roller-burnishing and crimping have a negative influence on the coaxiality and roundness of the housing and of the tube portion in which the forming takes place. This can lead to problems during the further processing of the gas generator module for an airbag system of a motor vehicle, for example during welding. In addition, there are problems in respect of scale formation and annealing effects during the hot roller-burnishing process.

SUMMARY

It is therefore the object of the invention to develop a housing of a gas generator module for an airbag system of a motor vehicle according to the preamble of patent claim 1 in such a manner that internal components can be fixed axially in a tube portion. Such internal components can be, for example, sieve-like internal components which have to be secured against axial displacement as a consequence of a vibration loading in the vehicle or as a consequence of differences in pressure during the triggering of the generator. Furthermore, it is an object of the invention to provide a method for producing such a housing of a gas generator module for an airbag system of a motor vehicle.

In respect of the housing, the object is achieved by a housing with all of the features of patent claim 1. With regard to the method for producing such a housing, the object is achieved by a method with all of the features of patent claim 10. Advantageous refinements of the invention are found in the dependent claims.

The housing according to the invention of a gas generator module for an airbag system of a motor vehicle is of substantially tubular design here and has a tube portion in which a plurality of stamped formations pointing into the interior of the housing are introduced over an external circumference of the housing. The housing according to the invention is distinguished in that said stamped formations in the interior of the tube portion have a stop for an internal component.

The invention makes it possible to produce a housing of a gas generator module for an airbag system of a motor vehicle with simple tool and work piece movements, and therefore complicated and complex tool and workpiece movements and tool configurations can be dispensed with. For this purpose, an internal tool is introduced axially into the housing in a simple manner and the stamped formations are introduced into the tube portion of the housing by means of a radial feed motion of an external tool, with a stop for an internal part being formed. The stamped formations are then introduced here in the corresponding tube portion over the circumference of the housing and, on the one side, ensure a sharp transition, and therefore a good fixing action, in particular with the formation of edges having stop surfaces, and, on the other hand, gentle forming of the material. Said gentle forming of the material is achieved in that, during the forming operation, external tools, for example in the form of a preferably rounded stamping mandrel, and internal tools, for example in the form of a likewise preferably rounded supporting mandrel, which is adapted to the contour of the stamping mandrel, act in combination. The stamped formations are formed here in the interior of the tube portion itself as a stop for an inner part, in particular for an igniting device or sieve disk, which can be arranged in the interior of the housing. Such stops for internal components are very precisely positioned by means of the stamped formations, as a result of which then, of course, particularly precise positioning of the internal components is also possible. Depending on the design of the stop of the stamped formations, both an axial and radial positioning of the internal components can take place particularly precisely here.

According to a further concept of the invention, it is provided that the stop of the stamped formations in the interior of the tubular housing is designed as a supporting surface for an internal component. By means of such supporting surfaces, the stamped formations in the interior of the housing can already be adapted during production to the internal components to be fixed, and therefore the fixing of said internal components is yet again optimized.

The stop can be designed here in the form of a step, wherein the supporting surface lies perpendicularly on the wall of the tube portion. By this means, in particular a very precise axial positioning of an internal component in the housing according to the invention is permitted since the supporting surface here is designed for forming an axially parallel supporting action on the internal component in the longitudinal direction.

Alternatively, however, the stop can also be designed in the form of a step, wherein the supporting surface forms an obtuse angle with the wall of the tubular portion in the region which is provided for the internal component. By this means, in particular, a very precise radial positioning of an internal component in the housing according to the invention is made possible.

It has furthermore proven advantageous here for the supporting surface to be adapted to the surface of the internal component which is to be supported, in order to optimize both axial and radial positioning of an internal component in the housing according to the invention.

In order to be able to bring about a corresponding forming of the tube portion of the housing with introduction of the stamped portions, the tubular housing is composed of a metal, particularly preferably of a steel or a steel alloy. Such metals or steels or steel alloys have a required bursting strength for the use as a gas generator module for an airbag system of a motor vehicle and can be correspondingly formed by the known forming processes.

It is particularly advantageous here if the stamped formations are designed as ellipsoidal, semi-ellipsoidal or polygonal stamped formations, wherein, in the case of polygonal stamped formations, the latter are advantageously rounded in the corner regions. By means of this configuration of the stamped formations, it is particularly readily made possible to achieve a sharp transition between the stamped formations in the tube portion of the housing and the housing itself and, in the process, to form the stops for an internal component, in particular in the form of supporting surfaces. This permits a particularly good fixing property for internal components to be arranged within the housing, for example sieve disks or the like, both in the axial and radial direction. In this case, firstly, a sharp transition and therefore a good supporting action are realized in particular in the axial direction of the stop or of the supporting surface, and, secondly, gentle molding of the material with a low notch effect is realized.

The same direction is aimed at by the refinement of the invention, according to which it is provided that each stamped formation is formed rotationally non-symmetrically with respect to an axis running through the center point of the respective ellipsoid and at an inclination with respect to the center longitudinal axis of the tubular housing. By this means, the stamped formations have a geometry, which is non-symmetrical in the axial direction of the housing, with respect to an axis through the respective center point of the respective ellipsoid, said axis running outside the housing parallel to the center longitudinal axis of the tubular housing, and therefore those regions of the stamped portions which act in a fixing manner for an internal component are significantly larger than in the case of circular impressions.

It should be basically emphasized once again here that significantly reduced formations at the housing are necessary for meeting the function according to the invention in respect of fixing internal components, and therefore the stresses of the material or of the housing in the production process are significantly more gentle in comparison to the known processes of roller-burnishing or crimping. This also leads to better material properties and to an advantageous internal stress state for the dynamic loading of the housing. In addition, the roundness and coaxiality of the tube portion with the stamped formations are now present in unchanged form in contrast to tube portions having a peripherally roller-burnished bead or crimped regions, and therefore a significantly simpler axial introduction of internal components which are to be supported into the housing also results.

It is of particular advantage here that at least three stamped formations, in particular four or eight stamped formations are arranged over the external circumference of the tubular housing in the corresponding tube portion. At least 15% of the external circumference can preferably remain unstamped here. It is thereby made possible to arrange the stamped formations as corresponding fixing elements for internal components over a large part of the external circumference of the tube portion of the housing without however having to form the tube portion over its entire external circumference.

It is furthermore of particular advantage if at least the tube portion of the housing with the stamped formations is designed to already be tempered, in particular hardened and annealed, before the stamping. By means of this measure, the housing is optimized yet again in respect of its bursting strength at least in the region of the tube portion with the stamped formations.

In principle, according to a further concept of the invention, the housing has a tensile strength RM of greater than 800 MPa, preferably greater than 950 MPa. Housings having such tensile strengths are suitable in a particularly good manner for use in gas generator modules for an airbag system of a motor vehicle since a targeted outlet of gas for inflating the airbag within as short a time as possible has to be ensured there without the housing being deformed in the process.

The method according to the invention for producing a housing of a gas generator module for an airbag system of a motor vehicle has the following method steps here:
 a) Providing a tubular housing made of a metal, a steel or a steel alloy,
 b) Positioning at least one stamping mandrel over an external circumference in a tube portion of the housing,
 c) Introducing stamped formations over the external circumference into the tube portion of the housing and by means of the stamping mandrel, and
 d) Removing the housing with stamped formations for further processing.

The method according to the invention makes it possible in a simple manner to produce a housing according to the invention in a gentle manner and simply in terms of method, and therefore the outlay on workpieces and tools can be kept relatively simple. In particular, in the case of such a production method, no complex tool installations are necessary and also complex movements of the workpiece in a plurality of directions in space can be dispensed with.

According to a further concept of the invention, it is provided here that, before stamped formations are introduced by means of the stamping mandrel over the external circumference of the housing, an internal tool, in particular a supporting mandrel, is placed in the interior of the housing opposite the external circumference at which the stamped formations are intended to be introduced. By means of such an internal tool or supporting mandrel, the stamped formation in the interior of the housing can be produced in a highly precise and defined manner, and therefore the housing properties, in particular fixing properties for an internal component, can be set very precisely by means of the method according to the invention.

It is also particularly advantageous here that the housing or at least the tube portion with the stamped formations is tempered, in particular hardened and annealed before the stamping.

It has proven advantageous here for the stamped formations to be introduced by means of cold stamping or semi-hot stamping.

However, it is of particular advantage for tempering to take place before or after cold stamping or hot stamping.

Further aims, advantages, features and possibilities of using the present invention will emerge from the description below of exemplary embodiments with reference to the drawings. All of the described and/or pictorially illustrated features by themselves or in any desired expedient combination form the subject matter of the present invention, also irrespective of the combination thereof in the claims or the dependency references thereof.

DETAILED DESCRIPTION

Figure 1:
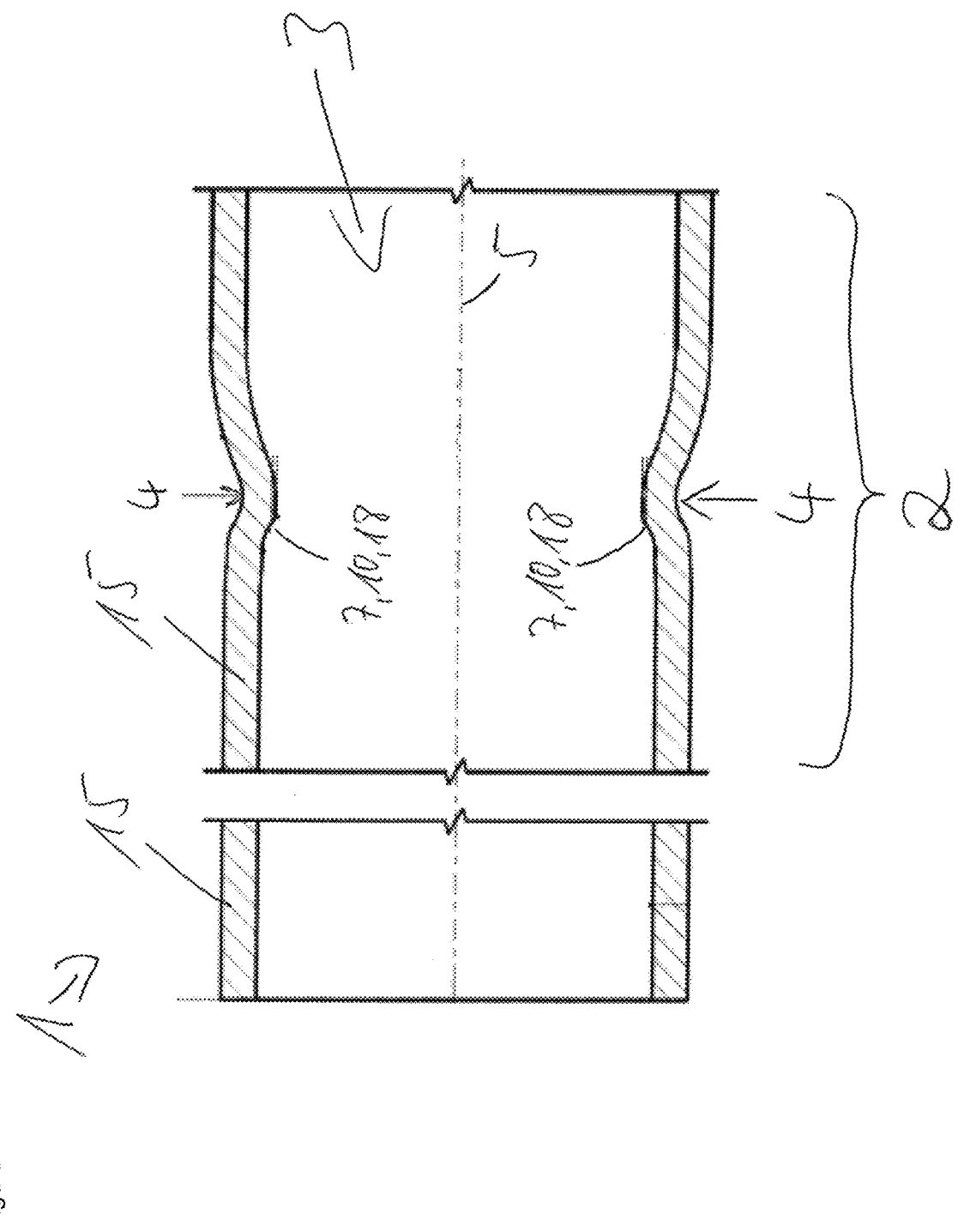
FIG. 1 shows a cross-sectional illustration of an exemplary embodiment of a housing according to the invention in the region of a tube portion with ellipsoidal stamped portions.

FIG. 1 shows, partly in a cross-sectional illustration, a first exemplary embodiment of a housing 1 according to the invention of a gas generator for an airbag system of a motor vehicle. in particular, it can already be seen here that the housing 1 is of tubular design and has a tube portion 2 in which a plurality of stamped formations 4 pointing into the interior 3 of the housing 1 are introduced over the external circumference of the housing.

The stamped formations 4 are introduced here in the wall 15 of the housing 1 on the outer side thereof. It cannot yet be seen in the illustration of FIG. 1 that the stamped formations 4 are designed as ellipsoidal stamped formations 4 which are of semi-ellipsoidal shape in this exemplary embodiment. In this connection, semi-ellipsoid is intended to be understood as meaning an ellipsoid which is divided precisely centrally. In the interior 3 of the housing 1, the stamped formations 4 form a stop 7 in the tube portion 2 for an internal component 8 which is to be positioned or fixed in the interior 3 of the housing 1, for example in the form of a sieve disk 9, which is not, however, shown here.

Furthermore, the center longitudinal axis 5 of the tubular housing 1 is also shown in FIG. 1. The stamped formations 4 can be arranged rotationally symmetrically here about said central longitudinal axis 5. However, it is also possible to arrange the orientations of the semi-ellipsoidal stamped formations 4 on the external circumference on the wall 15 of the tube portion 2 of the housing 1 in such a manner that they do not have any rotational symmetry with respect to the center longitudinal axis 5 of the tubular housing 1.

Figure 2:
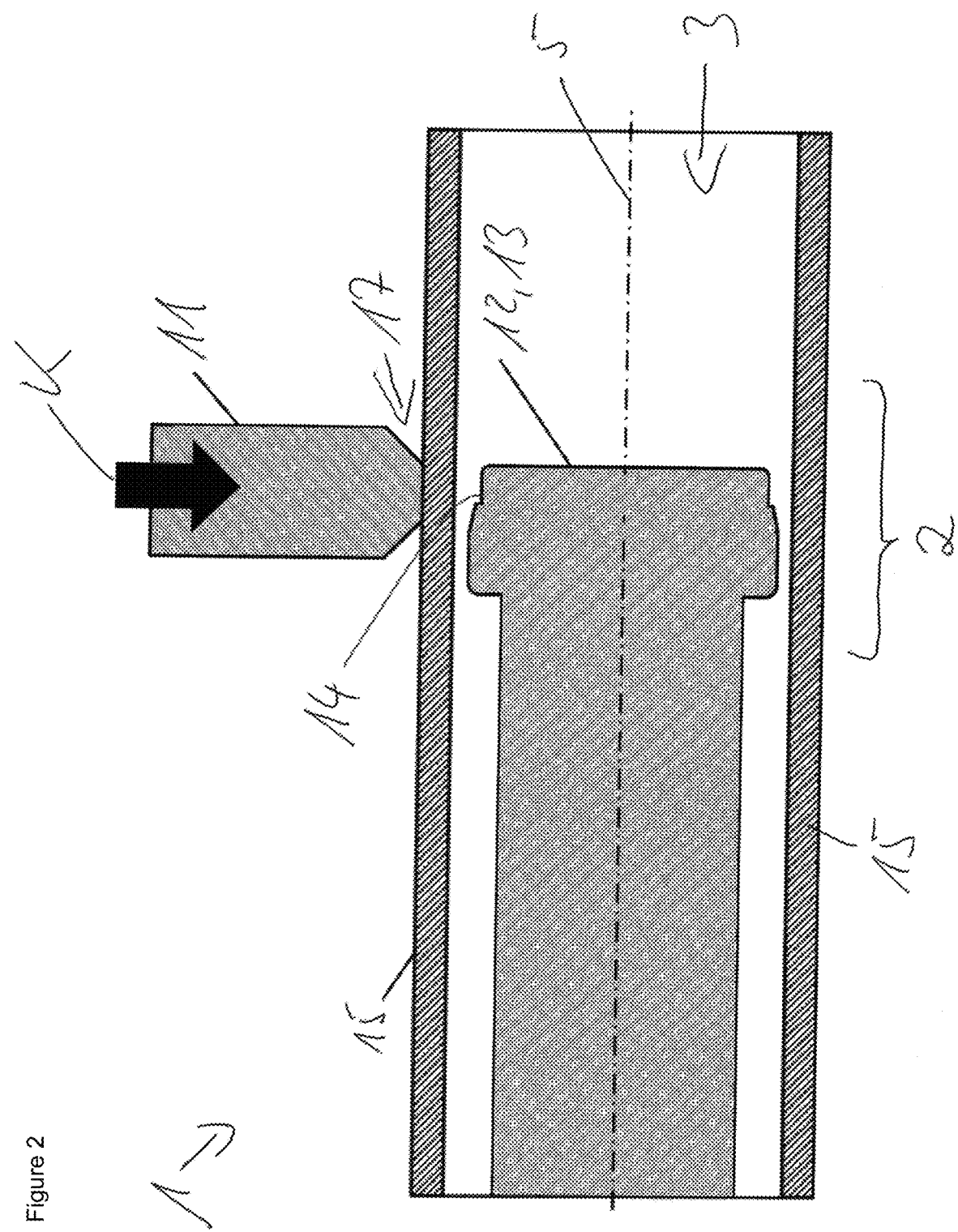
FIG. 2 shows a cross-sectional illustration of a first production step of a method according to the invention for producing a housing according to the invention.

FIG. 2 now illustrates, in a cross-sectional illustration, a first method step for producing a housing 1 according to the invention. An internal tool 12 in the form of a supporting mandrel 13 is introduced here into the interior 3 of the tubular housing 1 as far as the tube portion 2 in which the stamped formations 4 are intended to be introduced. The present supporting mandrel 13 here has a gradation 14. Said gradation 14 serves, in the stamped formations 4 to be produced on the inner side of the wall 15 of the housing 1, to introduce a step 10 with a supporting surface 18 which serves as a stop 7 for an internal component 8, in particular a sieve disk 9. In the present exemplary embodiment of FIG. 2, the supporting surface 18 here lies perpendicularly to the wall 15 of the tube portion 2.

In order to introduce the stamped portions 4 into the wall 15 or the external circumference in the tube portion 2 of the housing 1, a stamping mandrel 11 is now provided which has a semi-ellipsoidally shaped end 17. By means of a force K, which is illustrated in FIG. 2 as a fat black arrow, the wall 15 over the external circumference of the housing 1 is now deformed in the tube portion 2, as a result of which the semi-ellipsoidal stamped portion 4 in the wall 15 on the external circumference of the housing 1 is formed in the region of the tube portion 2. In the interior, the wall 15 is pressed here against the internal tool 12 in the form of the supporting mandrel 13, wherein, by means of the gradation 14 of the supporting mandrel 13, a step 10 with a supporting surface 18 is introduced into the stamped formation 4 on the inner side of the wall 15 of the housing 1, said step serving as a stop 7 for an internal component 8, in particular a sieve disk 9. In the present exemplary embodiment of FIG. 2 the supporting surface 18 lies perpendicularly here to the wall of the tube portion 2.

Figure 3:
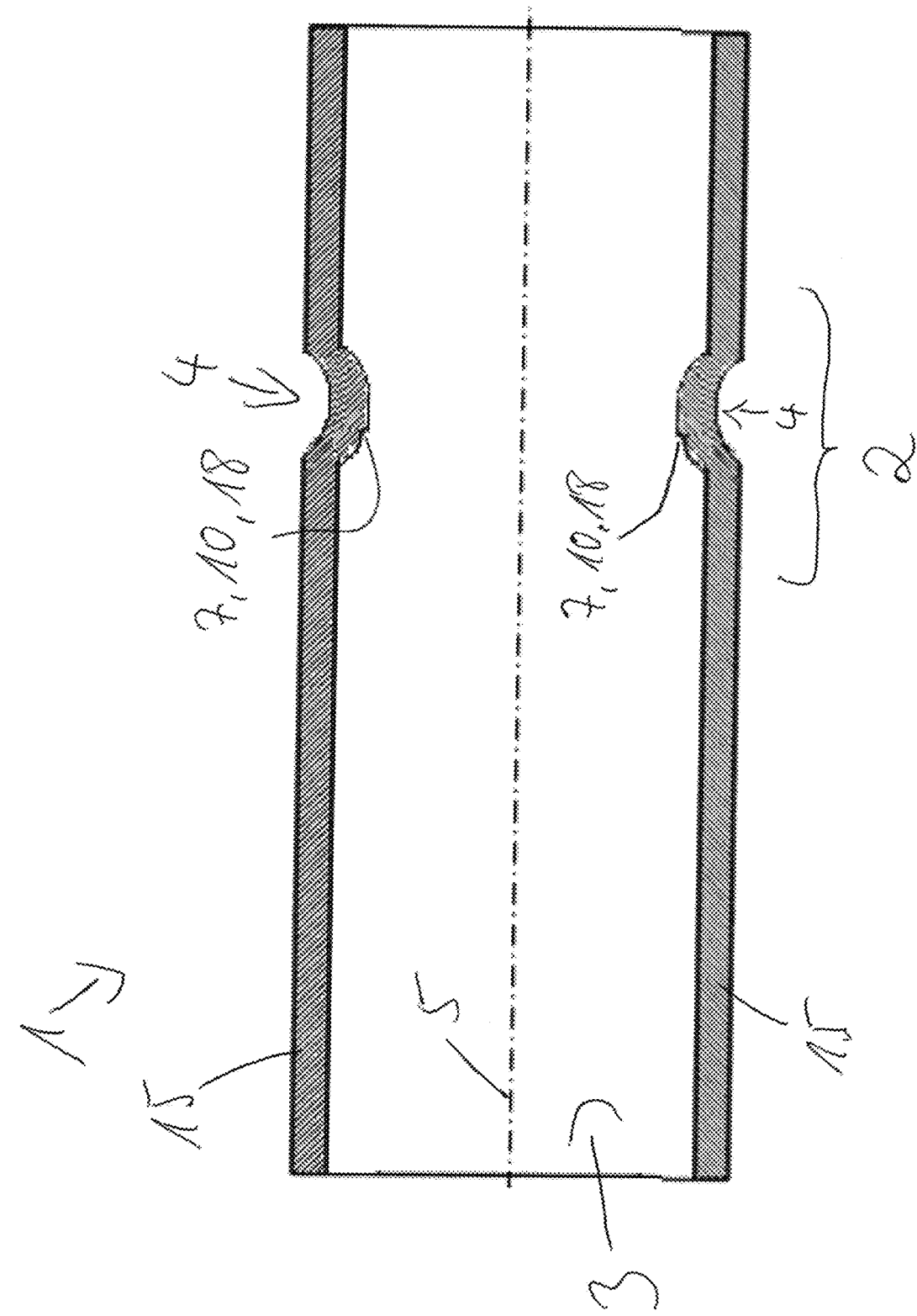
FIG. 3 shows a cross-sectional illustration of a first exemplary embodiment of a housing according to the invention.

FIG. 3 shows a cross-sectional illustration of a housing 1 according to the invention after production with a method step illustrated in FIG. 2. Two introduced semi-ellipsoidal stamped formations 4 which lie opposite in the tube portion 2 on the circumference of the housing 1 and are formed in the interior 3 of the housing 1 with a step 10, which serves as a stop 7 and has a supporting surface 18, can now be clearly seen. An internal component 8, for example a sieve disk 9, can be supported on said supporting surface 18 of the stop 7, which is designed as a step 10.

Figure 4:
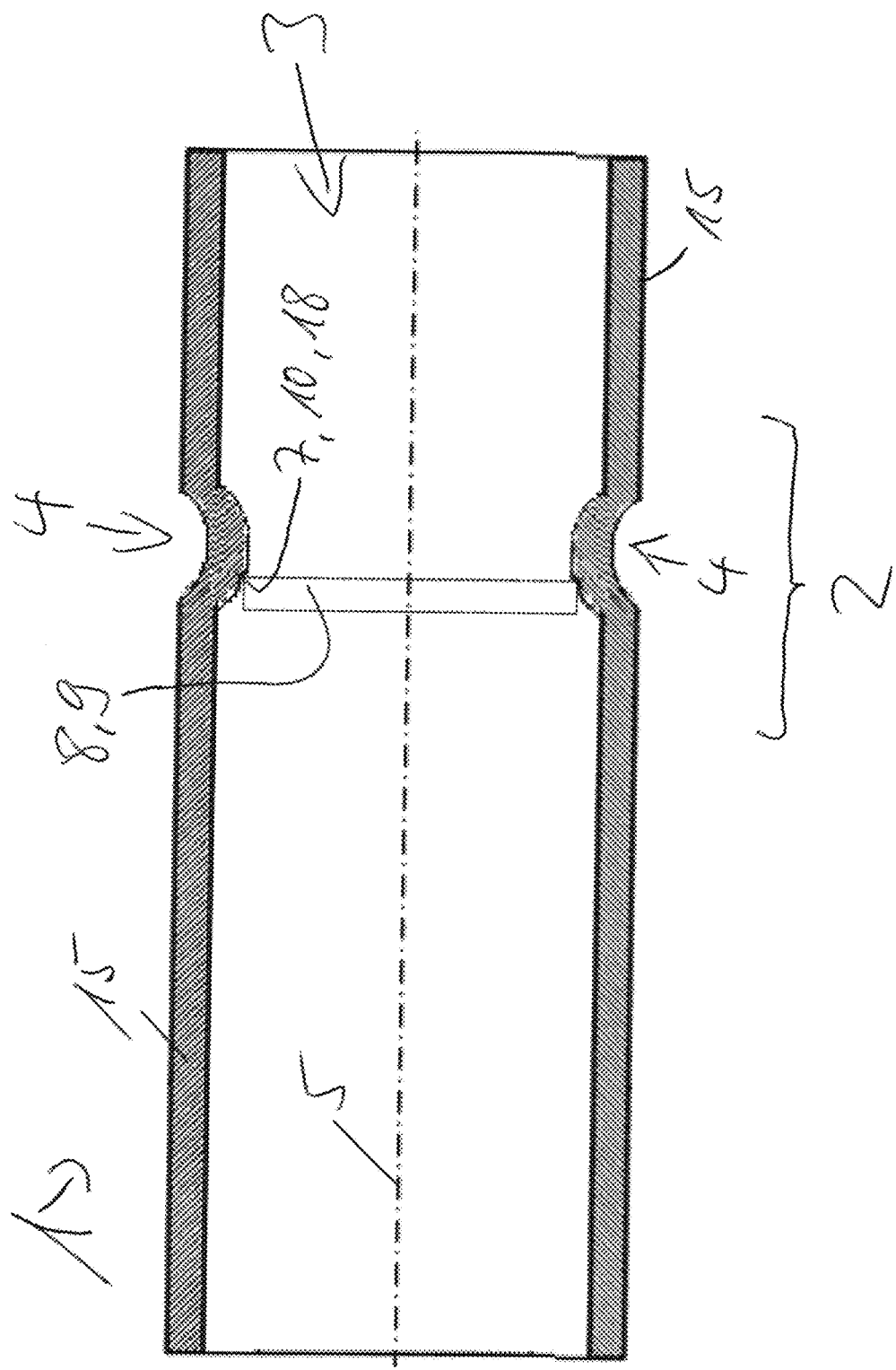
FIG. 4 shows a cross-sectional illustration of the housing according to the invention according to FIG. 3 with an inserted internal part.

Such an internal component 8 which is designed in the form of a sieve disk 9 is now shown in FIG. 4 in a cross-sectional illustration in which said sieve disk 9 is supported on the supporting surface 18 of the step 10, designed as a stop 7, of the stamped formations 4 in the wall 15 in the tube portion 2 of the housing 1 on the inner side thereof.

Figure 5:
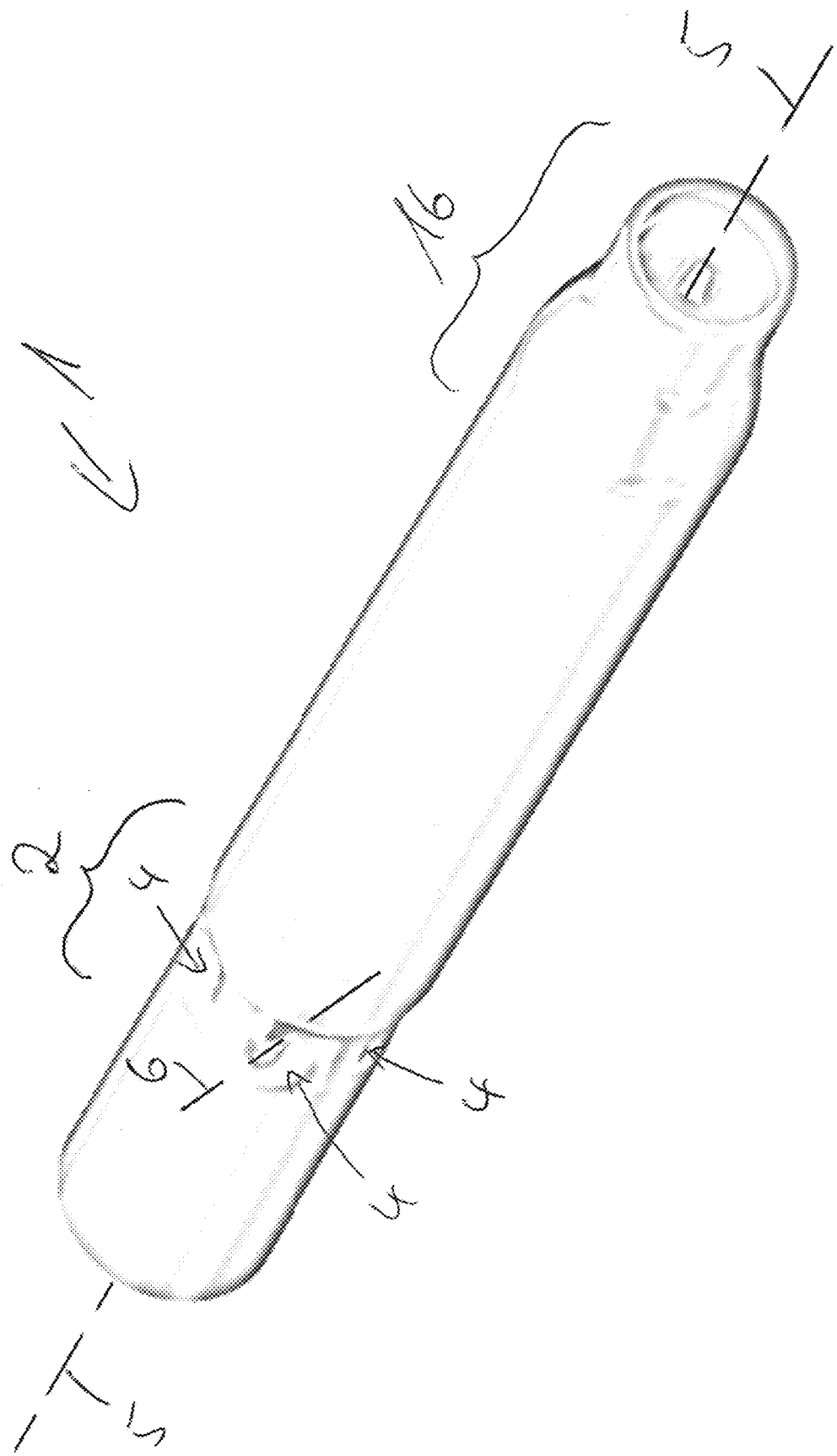
FIG. 5 shows a further exemplary embodiment of a housing according to the invention.

Finally, FIG. 5 shows a further exemplary embodiment of a housing 1 according to the invention in a perspective illustration. The housing 1 there has a tapering end 16 while the opposite end of the housing 1 has the original diameter of the housing. Furthermore, said housing 1 now has a tube portion 2 in which semi-ellipsoidal stamped formations 4 are introduced.

Three such stamped formations 4 can be seen in the illustration of FIG. 5. Overall, the housing 1 of FIG. 5 has six stamped formations 4 distributed equidistantly in the tube portion 2 over its circumference, wherein in each case two stamped formations 4 are arranged opposite each other. The orientation of the stamped formations 4 is always identical here, with the stamped formations 4 being designed in such a manner that they are formed rotationally non-symmetrically with respect to an axis 6 running through the center point of the respective ellipsoid and at an inclination with respect to the center longitudinal axis 5 of the tubular housing 1.

However, the exemplary embodiment of FIG. 5 illustrates such an axis 6 only for the central semi-ellipsoidal stamped formation 4. The axes 6 existing for the further stamped formations 4 are distributed in a rotationally symmetrical manner about the center longitudinal axis 5 of the housing 1 in each case by an angle of rotation of 30°.

Figure 6:
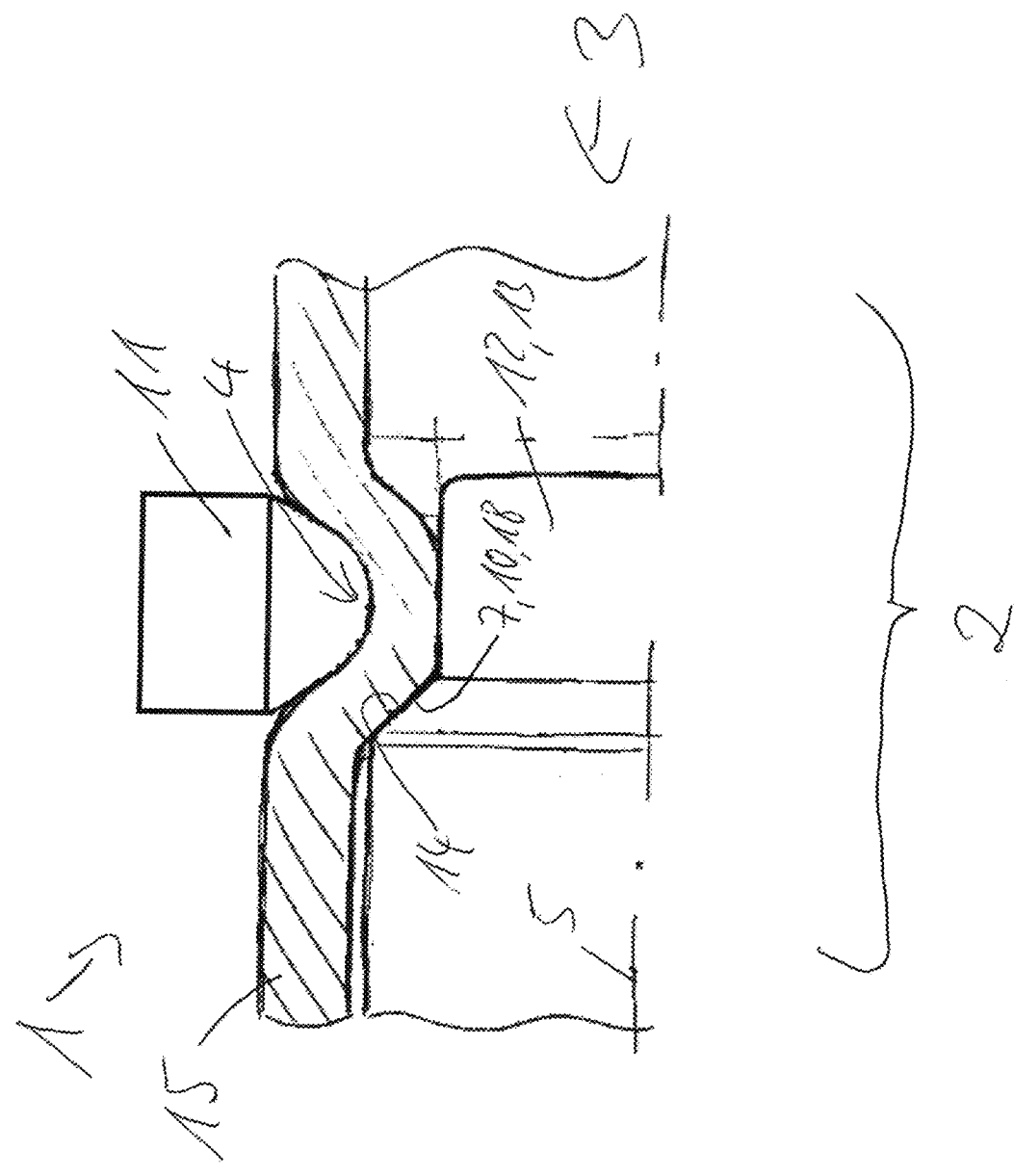
FIG. 6 shows a cross-sectional illustration of a production step of a method according to the invention for producing a housing according to the invention in detail.

FIG. 6 now illustrates, in a cross-sectional illustration, a method step for producing a further housing 1 according to the invention. An internal tool 12 in the form of a supporting mandrel 13 is introduced here into the interior of the tubular housing 1 as far as the tube portion 2 in which the stamped formations 4 are intended to be introduced. The present supporting mandrel 13 here has a gradation 14. Said gradation serves to introduce a step 10 having a supporting surface 18 in the stamped formations 4 to be produced on the inner side of the wall 15 of the housing 1, said step serving as a stop 7 for an internal component 8, in particular a sieve disk 9. In contrast to the illustration of FIG. 2, in the present exemplary embodiment of FIG. 6, the supporting surface 18 does not lie perpendicularly to the wall 15 of the tube portion 2, but rather forms an obtuse angle with the wall 15 of the tube portion 2 in the direction of the housing 1, from which direction the supporting mandrel 13 is introduced. The effect achieved in this exemplary embodiment is that the stop 7 or the supporting surface 18 not only permits or exemplifies axial positioning of an internal component 8. Furthermore, by means of the supporting surface 18 which now runs obliquely radial positioning of an internal component 8 is also made possible if the latter has a contour which is adapted to the contour of the stop 7, in particular of the supporting surface 18. This makes it possible for radial fixing of the internal component 8 with respect to the tube longitudinal axis 5 to be permitted in addition to the axial supporting of the internal component 8 or instead.

Figure 8:
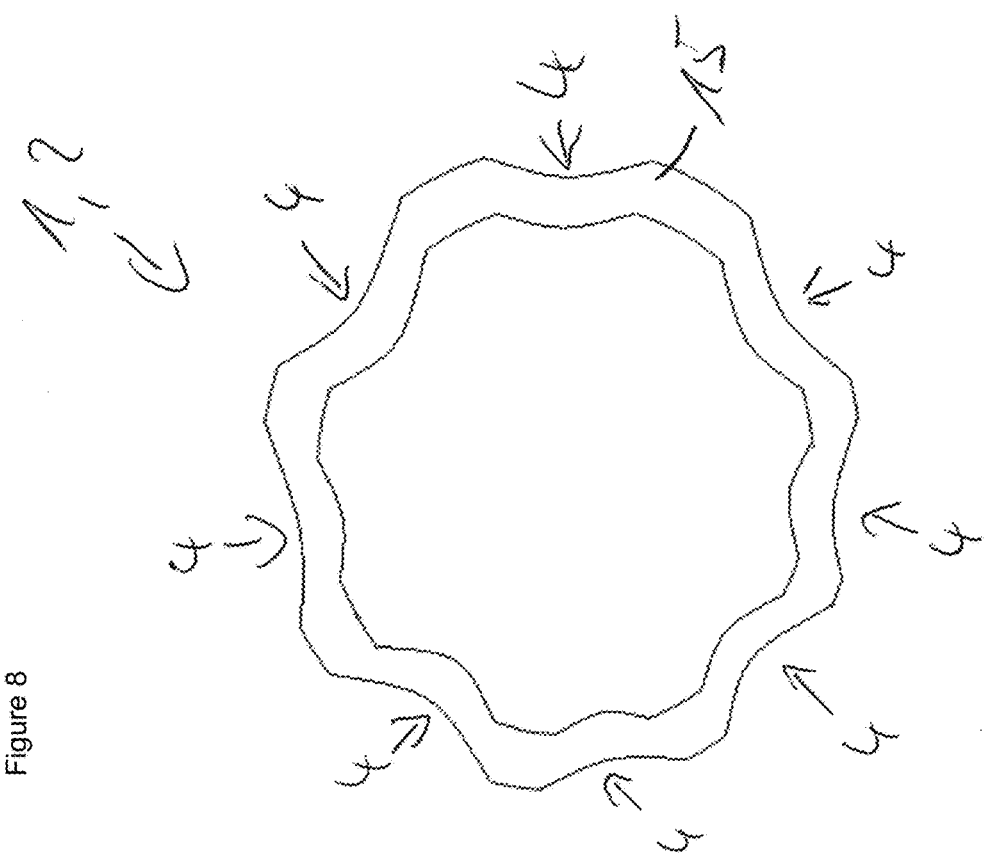
FIGS. 7 to 9 show cross-sectional illustrations of further exemplary embodiments of housings according to the invention.
Figure 7:
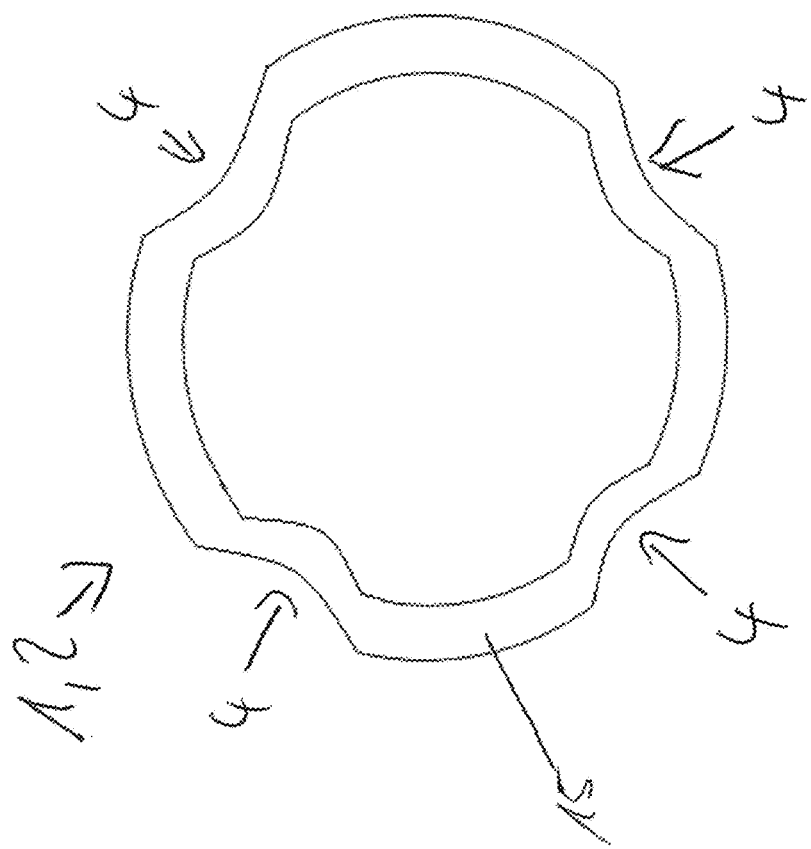

FIGS. 7 and 8 now illustrate two exemplary embodiments of housings according to the invention in cross section in the region of the tube portion 2 in which the stamped formations 4 are introduced. In the exemplary embodiment of FIG. 7, the housing 1 is provided here with four stamped formations 4 while the exemplary embodiment of the housing 1 of FIG. 8 has eight stamped formations 4. In the two exemplary embodiments, the stamped formations 4 are arranged circularly here over a circumference of the housing 1.

Figure 9:
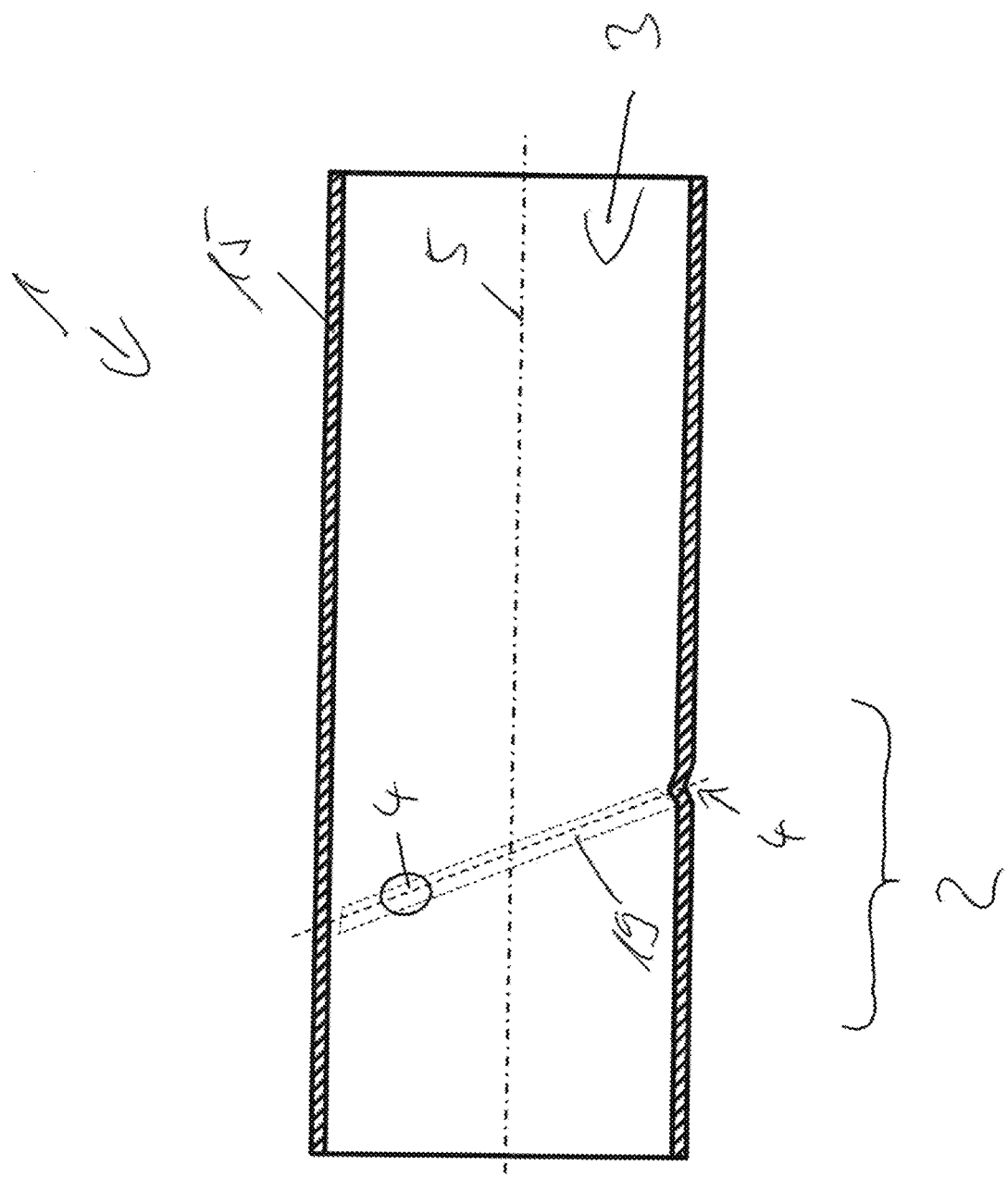

By contrast thereto, FIG. 9 shows an exemplary embodiment of a housing according to the invention in a cross-sectional illustration along the longitudinal axis 5 of the housing 1, wherein the stamped formations 4 are now not arranged circularly over a circumference of the housing 1, but rather on an ellipse 19 over the circumference of the housing 1.

However, it is of course also possible to arrange the stamped formations 4 not only circularly or on an ellipse 19 over the circumference of the housing 1. Stamped formations 4 which are arranged in a spiral or the like over the circumference of the housing 1 are also conceivable.

LIST OF REFERENCE SIGNS

1 Housing
2 Tube portion
3 Interior
4 Stamped formation
5 Center longitudinal axis
6 Axis
7 Stop
8 Internal component
9 Sieve disk
10 Step
11 Stamping mandrel
12 Internal tool
13 Supporting mandrel
14 Gradation
15 Wall
16 End
17 End
18 Supporting surface
19 Ellipse
K Force

What is claimed is:

1. A housing of a gas generator module for an airbag system of a motor vehicle, wherein the housing is of substantially tubular design and has a tube portion in which a plurality of stamped formations pointing into an interior of the housing are introduced over an external circumference of the housing, wherein the plurality of stamped formations in an interior of the tube portion have a stop for an internal component, wherein the stop is designed as a supporting surface for the internal component, and wherein each stamped formation is formed rotationally non-symmetrically with respect to an axis running through a center point of a respective ellipsoid and at an inclination with respect to a center longitudinal axis of the tubular housing.

2. The housing as claimed in claim 1, wherein the stop is designed in the form of a step, and wherein the supporting surface lies perpendicularly on a wall of the tube portion.

3. The housing as claimed in claim 1, wherein the stop is designed in the form of a step, and wherein the supporting surface forms an obtuse angle with a wall of the tube portion in a region that is provided for the internal component.

4. The housing as claimed in claim 1, wherein the supporting surface is adapted to the surface of the internal component that is to be supported.

5. The housing as claimed in claim 1, wherein the supporting surface is designed for forming an axially parallel supporting action on the internal component in a longitudinal direction.

6. The housing as claimed in claim 1, wherein the housing is composed of a metal.

7. The housing as claimed in claim 1, wherein the plurality of stamped formations are designed as ellipsoidal or polygonal stamped formations.

8. The housing as claimed in claim 1, wherein the plurality of stamped formations are arranged in a cross-sectional plane that extends perpendicularly to the center longitudinal axis of the tube portion.

9. The housing as claimed in claim 1, wherein at least three stamped formations are arranged over the external circumference of the tubular housing.

10. The housing as claimed in claim 1, wherein the tube portion with the plurality of stamped formations is designed to be tempered.

11. The housing as claimed in claim 1, wherein the housing has a tensile strength Rm of greater than 800 MPa.

12. A method for producing a housing, comprising:
providing a tubular housing made of a metal, a steel, or a steel alloy;
positioning at least one stamping mandrel over an external circumference in a tube portion of the housing;
introducing stamped formations over the external circumference into the tube portion of the housing by means of the at least one stamping mandrel; and
removing the housing with the stamped formations for further processing, wherein the stamped formations in an interior of the tube portion have a stop for an internal component, and wherein the stop is designed as a supporting surface for the internal component.

13. The method as claimed in claim 12, wherein, before the stamped formations are introduced by means of the at least one stamping mandrel over an external circumference of the housing, an internal tool is placed in an interior of the housing opposite the external circumference.

14. The method as claimed in claim 12, wherein the housing or the tube portion is tempered, and wherein the tempering takes place before the stamping.

15. The method as claimed in claim 12, wherein the stamped formations are introduced by means of cold stamping or semi-hot stamping.

16. The method as claimed in claim 15, wherein a tempering takes place before or after cold stamping or semi-hot stamping.

17. The housing as claimed in claim 1, wherein the housing is composed of a steel or a steel alloy.

18. The housing as claimed in claim 1, wherein the plurality of stamped formations are semi-ellipsoidal or polygonal stamped formations.

19. The housing as claimed in claim 1, wherein four or eight stamped formations are arranged over the external circumference of the tubular housing.

20. The method as claimed in claim 13, wherein the housing or the tube portion is tempered, and wherein the tempering takes place before the stamping.

* * * * *